United States Patent
Djupsjobacka et al.

(10) Patent No.: US 8,134,714 B2
(45) Date of Patent: Mar. 13, 2012

(54) RESONATOR LENGTH MEASUREMENT

(75) Inventors: Anders Djupsjobacka, Solna (SE); Hakan Dahlquist, Hasselby (SE)

(73) Assignee: Acreo AB and System 3R International AB (SE)

( * ) Notice: Subject to any disclaimer, the term of this patent is extended or adjusted under 35 U.S.C. 154(b) by 0 days.

(21) Appl. No.: 13/121,043

(22) PCT Filed: Oct. 9, 2009

(86) PCT No.: PCT/EP2009/063208
§ 371 (c)(1),
(2), (4) Date: Mar. 25, 2011

(87) PCT Pub. No.: WO2010/040838
PCT Pub. Date: Apr. 15, 2010

(65) Prior Publication Data
US 2011/0176143 A1 Jul. 21, 2011

(30) Foreign Application Priority Data
Oct. 10, 2008 (EP) ...................... 08166344

(51) Int. Cl.
*G01B 9/02* (2006.01)
(52) U.S. Cl. ........................................ 356/480
(58) Field of Classification Search ................ 356/480, 356/482, 498, 505, 506, 519; 250/227.19, 250/227.27
See application file for complete search history.

(56) References Cited

U.S. PATENT DOCUMENTS

| | | | |
|---|---|---|---|
| 4,593,368 A | 6/1986 | Fridge et al. | |
| 4,596,466 A * | 6/1986 | Ulrich | 356/497 |
| 5,555,089 A * | 9/1996 | Dunn et al. | 356/506 |
| 5,781,295 A | 7/1998 | Fuchs et al. | |
| 6,078,706 A | 6/2000 | Nau et al. | |
| 6,449,048 B1 | 9/2002 | Olszak | |
| 6,510,256 B1 | 1/2003 | Asseh et al. | |
| 7,099,015 B2 | 8/2006 | Melnyk | |
| 7,305,158 B2 * | 12/2007 | Jeffers et al. | 385/15 |
| 7,355,684 B2 * | 4/2008 | Jeffers et al. | 356/35.5 |
| 7,532,329 B2 * | 5/2009 | Tai et al. | 356/482 |
| 2005/0046862 A1 | 3/2005 | Melnyk | |

(Continued)

FOREIGN PATENT DOCUMENTS
DE 19528676 A1 2/1997
(Continued)

OTHER PUBLICATIONS
Egorov et al, "Spectrally Encoded Fiber-Optic Sensors Based on Fabry-Perot Interferometer", The International Society for Optical Engineering vol. 1972, p. 362-369.

(Continued)

*Primary Examiner* — Michael A Lyons
(74) *Attorney, Agent, or Firm* — Brooks Kushman P.C.

(57) ABSTRACT

The invention provides a method and system for measuring the length of a reflective resonator, by analyzing an electromagnetic spectrum emitted therefrom. The emitted spectrum is used for estimating a first cavity length. This estimation is thereafter improved, by first computing at least one interference number for the spectrum, adjust this value to e.g. an integer or half-integer depending on the configuration of the resonator, and thereafter re-calculating the length of the resonator using the adjusted value of the interference number. The above is an efficient way of improving the accuracy in the determination of a physical property of a resonator.

15 Claims, 3 Drawing Sheets

U.S. PATENT DOCUMENTS

| | | |
|---|---|---|
| 2005/0201661 A1 | 9/2005 | Loock et al. |
| 2006/0192955 A1 | 8/2006 | Jorgenson et al. |
| 2007/0013917 A1 | 1/2007 | Stubbe et al. |
| 2007/0086018 A1 | 4/2007 | Shih et al. |
| 2009/0315280 A1 | 12/2009 | Dahlquist |

FOREIGN PATENT DOCUMENTS

| | | |
|---|---|---|
| EP | 1849556 A1 | 10/2007 |
| WO | 0017604 A1 | 3/2000 |

OTHER PUBLICATIONS

SEMI MF95-89 (Reapproved 2000), "Test Method for Thickness of Lightly Doped Silicon Epitaxial Layers on Heavily Doped Silicon Substrates Using an Infrared Dispersive Spectrophotometer", Oct. 2003, XP40454207A, p. 1-12.

Egorov et al. Jul. 1995, "Spectral Signal Processing in Intrinsic Interferometric Sensors Based on Birefringent Polarization-Maintaining Optical Fibers", Journal of Lightwave Technology vol. 13, No. 7, p. 1231-1236.

International Search Report for PCT/EP2009/063208, Completed by the European Patent Office on Dec. 9, 2009, 4 Pages.

Written Opinion for PCT/EP2009/063208, Completed by the European Patent Office, 9 Pages.

International Preliminary Report on Patentability, Completed by the European Patent Office on Nov. 24, 2010, 12 Pages.

Partial European Search Report for Application No. 08166344.5, Completed by the European Patent Office on Feb. 16, 2009, 10 Pages.

* cited by examiner

RESONATOR LENGTH MEASUREMENT

CROSS-REFERENCE TO RELATED APPLICATION

This application is the U.S. national phase of PCT Appln. No. PCT/EP2009/063208 filed Oct. 9, 2009 which claims priority to EP application 08166344.5 filed Oct. 10, 2008, the disclosures of which are incorporated in their entirety by reference herein.

TECHNICAL FIELD OF THE INVENTION

The present invention relates to a method of determining the length of a resonator, an arrangement for determining the length of a resonator as well as a computer program for measuring the length of a resonator. The measurement is based on an analysis of a recorded electromagnetic spectrum received from said resonator.

BACKGROUND ART

In recent year there has evolved a demand for in process high precision measurements. For many applications, the measuring process should preferably be fast, such that it can be used for continuous controlling of e.g. a milling machine or an EDM (electrical discharge machine).

The above is illustrated by the following example. In an EDM, a chuck and a holder is normally used to clamp the work piece that is to be machined. The position accuracy in the plane of the chuck is normally about +/−2 μm, and this is sufficient for most application. However, a major application area is manufacturing of electrodes for EDM:ing (Electrical Discharge Machining) and mould making by EDM:ing, as the last step. In recent years there has been an upcoming need for high precisions moulds, which are used for production of e.g. optical lenses with very high accuracy and very accurate micro parts. Further, there is also a need for extremely accurate machining of micro parts. The position accuracy for the coupling must then be on sub-micron level (e.g. +/−0.2 μm). This is not possible to achieve with conventional couplings and especially not in the environment of an electrode and mould production process, as conventional system often are space needing and sensitive to traces of liquids, such as dielectricum and cooling liquids, fog, smoke, dust and particles from the process. Moreover, the sub-micron position of the holder is affected by the process forces and temperature gradients. Continuous position measurements with sub-micron accuracy are therefore preferably used.

Further, the chuck is subjected to wear, which depends on the number of clampings, the process forces and particles from the process. The wear affects the position accuracy and must be monitored to replace the chuck in time before it has been worn down. Normally, the loss of accuracy due to wear is today measured in a separate process, often manual, in stead of at each clamping.

U.S. Pat. No. 6,078,706 discloses a quasi-static fiber pressure sensor using self-referenced interferometry based on a broadband semiconductor source which probes the pressure plate deflection within a Fabry-Perot cavity where phase is demodulated with a dual grating spectrometer providing real-time, high resolution remote measurement of pressure using optical interrogation of a deflecting pressure plate. This technique yields absolute gap measurement in real time over a wide range of gap lengths with nanometre resolution. By tailoring the pressure plate design to cover the range of gaps and deflection that can be resolved, pressure sensing with psi resolution can be obtained in a kpsig pressure range.

U.S. Pat. No. 7,099,015 B2 describes a further fiber optic sensing device, which uses a Fabry-Perot cavity to sense a physical parameter. The cavity modulates the incident polychromatic light. The modulated light is recorded by an optical spectrometer means. The spectrum is analyzed in a signal processing unit which normalizes the spectrum and determines the phase of the modulated signal. The phase accumulated over whole range of wavelengths, has been used for identification of the physical parameter using a look-up-table. The cavity, the polychromatic light source and the spectroscope means are connected by fiber optic means.

Egrov, S A: "Spectral signal processing in intrinsic interferometric sensors based on birefringent polarization-maintaining optical fibers", Journal of lightwave technology, Vol. 13, No. 7, July 1995, pages 1231-1236, ISSN: 0733-8724, which was cited against EP 08 166 344 wherefrom this application claims priority, describes a spectral signal processing technique which is applied in intrinsic strain, temperature and distributed linear position interferometric fiber optic sensors based on birefringent polarization maintaining fibers. The method provides non-incremental measurements of external physical parameters affecting the sensing fiber. Simultaneous interrogation of sensors in a network is also discussed.

According to this article an accurate value of the optical path difference is calculated according to the shift of one spectral resonance, with a known interference order, in the boundaries of one free spectral range from a predetermined frequency. Further, the article underlines that a prerequisite for the described signal processing algorithm is an unambiguous determination of the interference order. Moreover, the article explains that for an unambiguous determination of the interference order, it is required that the variance of the measurement of the optical path length is less than one sixth of the wavelength. Hence, it is a limitation that the algorithm is adapted for measuring small length differences, and also that the algorithm requires an unambiguous determination of the interference order.

Recently, an optical setup has been presented which enables position measurements with improved accuracy. The setup is described in EP 1 849 556, which is hereby incorporated by reference. According to one embodiment, the chuck presented therein has embedded position sensors for measuring six degrees of freedom (X, Y, Z, Xrot, Yrot and Zrot). The location of the sensors and the cross like beam structure of the holder allows the position deviations to be transformed to e.g. forces and moments in all directions (Fx, Fy, Fz, Mx, My, Mz). The position and load information may be used for monitoring and adaptive control purposes.

EP 1 849 556 refers to DE 195 28 676, which describes an optical system and a method of absolute distance measurements using two lasers of different frequencies. According to the measurement principle of DE 195 28 676 an interferometer is used, wherein the light from one of the lasers is sent in one leg of the interferometer and reflected towards the object surface, the distance to which is to be determined. The light from the other laser is sent in the other leg of the interferometer and reflected towards a reference surface, the distance to which is known. The two reflected light beams are super positioned, and by continuously changing the frequency of one of the lasers a varying intermediate frequency is formed. This intermediate frequency contains all of the necessary phase information required for distance measurements. The periodic signals are proportional to the change in frequency of the laser, as well as to the path difference of the interferometer.

A disadvantage of the above described method is that the optical signals received from the reference object must be continuously compared to the signals from the reference interferometer in order to enable a determination of the distance to the object. Hence, an age variation in the reference interferometer may cause a change in the measurement results. Further, due to the rather large number of components the system is space consuming. Additionally, as the measurement result is partially determined by the path difference between the two legs of the interferometer, the device is sensitive to misalignments.

SUMMARY OF THE INVENTION

The present invention provides new methods and arrangements for determining the length of a resonator having two end surfaces which reflects electromagnetic radiation. The drawbacks and limitations associated with the prior art are effectively eliminated or at least alleviated by a method, an arrangement and a computer program of the general kind set forth in the accompanying claims.

The present invention has further advantages, which will be apparent from the detailed description as set forth below.

It is a general object of the present invention to provide an improved method for determining the distance between two end surfaces in a resonator which is fast, may be implemented by means of basic algorithms and which may be performed without the use of a reference interferometer.

According to a first aspect thereof, the invention relates to a method of determining the length of a resonator or cavity or interferometer comprising:

providing a resonator or cavity or interferometer having a first and a second reflective end surface;

transmitting electromagnetic radiation in a waveguide, and emitting said radiation into said resonator or cavity or interferometer, wherein said radiation comprises at least one resonance wavelength;

forming at least one resonant wave inside said resonator or cavity or interferometer by means of said radiation;

transmitting a spectrum of said radiation, emitted out of said resonator or cavity or interferometer, in a waveguide to a recording unit;

recording said emitted spectrum by said recording unit, and providing said recorded spectrum to an analyzing unit;

estimating or determining, at said analyzing unit, at least one value of the resonator or cavity or interferometer length, wherein said estimating of at least one value of the resonator length comprises performing a Fourier transform of at least a portion of said recorded spectrum;

selecting, at said analyzing unit, at least one mark wavelength of said spectrum by determining a maximum, a minimum or an inflexion point of said recorded spectrum;

computing an estimated interference number, based on a ratio of two times said at least one value of the resonator or cavity or interferometer length and said working wavelength;

determining an actual interference number as the closest possible interference number to said estimated interference number;

computing a second value of the resonator or cavity or interferometer length based on half the product of said actual interference number and said working wavelength.

In relation to this invention, the act of determining an actual interference number as the closest possible interference number to said estimated interference number, may more specifically be performed by determining an actual interference number as the closest integer or half-integer to said estimated interference number. Choosing the closest possible integer or half-integer is normally performed by computing $2*L_{EST}/\lambda_M$, i.e. the ratio of two times said at least one value of the resonator length and said mark wavelength, and there after choosing the closest possible integer or half-integer. However, if instead the product $4*L_{EST}/\lambda_M$ is computed, and the closest integer is selected, this is in relation to this invention considered as choosing the closest possible half-integer to said estimated interference number. Moreover, if the product $4*L_{EST}/\lambda_M$ is computed, and the closest even integer is selected, this is in relation to this invention considered as choosing the closest possible integer to said estimated interference number. Consequently, if instead the product $2L_{EST}/\lambda_M$ is computed, and the closest integer is selected, this is in relation to this invention considered as choosing the closest possible half-integer to said estimated interference number, and so on and so forth.

It is to be noted that the measures or steps described above may be executed in any suitable order, as long as the desired result is achieved.

This method has the advantage of representing a fast and efficient way to improve the accuracy or precision of a determination of the resonator length, by utilizing mathematical functions which are already available in high level programming languages. That it may be implemented with already available mathematical functions increases the ease of programming, and normally also the execution time of the program. Additionally, the method is fast as there are relatively few mathematical operations that are performed in order to determine the cavity length. For a centre wavelength of the light source equal to e.g. about 800 nm, the accuracy of the determination is preferably better than +/−1 μm, more preferably better than +/−0.5 μm, even more preferred better than +/−100 nm, and most preferred better than +/−50 nm. Further, as it is independent of a continuous measurement of a reference interferometer, the accuracy of the measurement is not dependent on the condition of the reference interferometer. Additionally, according to most instances of the method it is also advantageous in that it provides an absolute measurement of the cavity length. I.e. there is normally no need for a reference surface, or a moving surface in order to be able to determine the length of the cavity. Neither is there a need for any calibration measurements by measuring the length of the cavity at known circumstances, i.e. when the length of the cavity is known, in order to determine one or several constants later used by the length determining algorithm. In other words, the method is self-supporting with respect to the values of the parameters necessary for performing the determination of the length of the resonator, i.e. no calibration procedure is necessary for determining the cavity length. Instead for most applications the information contained in one spectrum emitted from the resonator is sufficient in order to determine the length of the cavity with sufficient or desired accuracy. Further, the method is also advantageous as it allows a measurement of the cavity length, also when the cavity has a low visibility. Additionally, the method may be used to measure the cavity length over a wide spectral range, including e.g. more than thousand free spectral ranges. For example, for a measurement set up having a free spectral range of 5 nm and a cavity length varying from 30 μm to 120 μm, the above described method may be used to measure the cavity length, by just one measurement and without the use of any reference measurements, i.e. in an interval corresponding to about 18 000 free spectral ranges.

According to a second aspect thereof, the invention relates to a use of said method in a system for determining the length of a resonator, which system comprises:

a resonator;
a first set of radiation transmitting means arranged to transmit electromagnetic radiation to said resonator;
recording means operative to record an electromagnetic spectrum;
a second set of radiation transmitting means arranged to transmit radiation from said resonator to said recording means; and
analyzer operative to determine a length of said resonator by:
estimating or determining at least one value of the resonator length, wherein said estimating of at least one value of the resonator length comprises performing a Fourier transform of at least a portion of said recorded spectrum;
selecting at least one mark wavelength of said spectrum by estimating a maxima, minima or an inflexion point of said recorded spectrum;
computing an estimated interference number, based on a ratio of two times said at least one value of the resonator length and said working wavelength;
determining an actual interference number as the closest possible interference number (I) to said estimated interference number;
computing a second value of the resonator length based on half the product of said actual interference number and said working wavelength.

According to a third aspect thereof, the invention relates to a computer program comprising computer program instructions for controlling e.g. a system according to said second aspect of the invention and to program a programmable processing apparatus to become operable to perform a method comprising the steps of:

receiving a recorded electromagnetic spectrum modified by a resonator;
estimating or determining at least one value of the resonator length, wherein said estimating of at least one value of the resonator length comprises performing a Fourier transform of at least a portion of said recorded spectrum;
selecting a mark wavelength of said spectrum by determining a maxima, minima or an inflexion point of said recorded spectrum;
computing an estimated interference number, based on a ratio of two times said at least one value of the resonator length and said mark wavelength;
determining an actual interference number as the closest possible interference number to said estimated interference number;
computing a second value of the resonator length based on half the product of said actual interference number and said mark wavelength.

According to a fourth aspect thereof, the invention relates to a computer program carrying media comprising computer program for controlling a system according to said second aspect of the invention and to program a programmable processing apparatus to become operable to perform a method comprising the steps of:

receiving a recorded electromagnetic spectrum modified by a resonator;
estimating or determining at least one value of the resonator length, wherein said estimating of at least one value of the resonator length comprises performing a Fourier transform of at least a portion of said recorded spectrum;
selecting a mark wavelength of said spectrum by determining a maxima, minima or an inflexion point of said recorded spectrum;
computing an estimated interference number, based on a ratio of two times said at least one value of the resonator length and said mark wavelength;
determining an actual interference number as the closest possible interference number to said estimated interference number;
computing a second value of the resonator length based on half the product of said actual interference number and said mark wavelength.

Both said second and third aspect of the invention involves the same advantages as were discussed in relation to said first aspect thereof. Additionally, as the length of the cavity is determined by the emitted spectrum, the system is less sensitive to misalignments due e.g. to harsh environmental conditions and rough handling, compared to the prior art discussed above.

Basically, the invention provides a method, system and computer program carrying media for determining or measuring the length of a reflective resonator, by analyzing an electromagnetic spectrum comprising a resonant wave emitted therefrom. The emitted spectrum is used for estimating a first cavity length. This estimation is thereafter improved, by first computing at least one interference number for the spectrum, adjust this value to a possible interference number e.g. a integer or half-integer depending on the configuration of the resonator, and thereafter re-calculating the length of the resonator using the adjusted or corrected value of the interference number. The above steps provide an efficient way of improving the accuracy in the determination of a physical property of a resonator.

The method and system may for e.g. be used to determine the length of many types of resonators or interferometers, such as e.g. Fabry-Perot interferometers, Fizeau interferometers, Gires-Tournois etalons, Michelson interferometers, circular resonators etc.

In relation to this invention the term radiation emitting means refers to any radiation source capable of emitting electromagnetic radiation having a suitable wavelength range. According to one embodiment, said radiation source is a light source which emits radiation in one or more spectra selected from a group comprising the visible spectra, the near infrared spectra, the infrared spectra, the near UV-spectra, the UV-spectra, the X-ray spectra and the microwave-spectra. In other words said electromagnetic radiation may be radiation in the optical domain or light or visible light.

In relation to this invention the term resonator refers to an arrangement comprising two end surfaces, between which standing waves or resonant waves may form. I.e. at least one of the surfaces must reflect at least a portion of the incident radiation. The optical path of the resonator may be straight or bent. A resonator having a bent optical path preferably comprises reflective means for forwarding the radiation. The walls of a resonator having a straight optical path are preferably substantially parallel. In other words, the inclination of one surface as compared to the other is less than 10°, preferably less than 5°, even more preferred less than 3°, still more preferred less than 1° and most preferred less than 0.5°. The resonator may be open or closed. The difference between an open or closed resonator is that the closed resonator has one or several walls arranged between said side surfaces. According to one embodiment of the invention said resonator comprises two reflecting, substantially parallel walls for forming standing waves of said radiation inside said resonator. According to one example said resonator is a Fabry-Perot cavity, and preferably an asymmetric Fabry-Perot cavity. In an asymmetric Fabry-Perot cavity, there is a substantial difference in reflectivity between of the respective endwalls of the resonator. In this document the words resonator, cavity and interferometer are used interchangeably.

According to one example said resonator is a one armed resonator wherein all light travels along the same path, such as a Fabry-Perot cavity, as compared to a two armed resonator which receives two beams of light which travels along two different paths.

According to one example the length of the resonator is longer than 1 µm or longer than 10 µm or longer than 50 µm. Additionally or alternatively the length of the resonator is shorter than 50 cm or shorter than 15 cm or shorter than 10 cm or shorter than 1 cm or shorter than 10 mm or shorter than 1 mm or shorter than 500 µm or shorter than 200 µm. Any combination of the above values is possible. The variation in length of the resonator, which there is a desire to measure, may be at least 10 nm, or 100 nm, or 0.5 µm, or 10 µm or at least 50 µm or at least 100 µm or at least 0.5 mm. In other words, the method may measure a length variation of the cavity of at least 10 nm or at least 10 µm or at least 50 µm or at least 100 µm or at least 0.5 mm.

In relation to this invention the term band width refers to a wavelength or frequency interval, either as continuously emitted, from e.g. a LED, or as emitted over time, from e.g. a tunable laser. Through out this description band width and tunable range is used interchangeably. In other words, the light source may be a polychromatic light source generating light over a wide optical spectrum. According to one example, the light source emits a band width which corresponds to at least 3 or at least 7 free spectral ranges in the resonator to be measured.

In relation to this invention the term interference number, I, is e.g. I=2L/$\lambda_R$ and determines the order of the resonant wave. For each resonator there is a fundamental frequency, which corresponds to the standing wave having the lowest frequency, and overtones which are multiples of the fundamental frequency. For each resonator there are predetermined values which the interference number may assume, these values are also referred to as possible interference numbers. For a two-wall cavity or resonator where the radiation is emitted in at one of the end-walls, there are generally two types of resonances, a first type where the resonating waves fulfils the expression $\lambda_{R1}$=2L/N, N=1, 2, 3 . . . ; and a second type where the resonating waves fulfils the expression $\lambda_{R2}$=4L/(2N−1), N=1, 2, 3 . . . . In other words, for a resonator of the first type the possible interference numbers equals I=2L/$\lambda_{R1}$=N=1, 2, 3, i.e. any positive integer value. For a resonator of the second type the possible interference numbers equals I=2L/$\lambda_{R2}$= (2N−1)/2=0.5, 1.5, 2.5, i.e. any positive half-integer value. The fundamental frequency has the lowest interference number, the first overtone has the second lowest interference number etc. When a wavelength or frequency spectrum of the resonator is analysed, normally only a portion of the resonant wavelengths or resonant frequencies are distinguishable at the centre of the spectrum. Despite this an estimation of the interference number for a certain local maximum or minimum point, may be computed using e.g. 2L/$A_R$, depending on the configuration of the cavity, and thereafter adjust this value to the closest possible interference number. The group of possible interference numbers may be determined theoretically, based on the configuration of the resonator and the radiation source. Alternatively, the skilled man may determine the possible interference numbers of a certain resonator by e.g. emitting radiation having a well known wavelength with a very narrow band width into the resonator and analyzing the intensity of the radiation emitted therefrom, for at least a portion of the wavelength range of the light source, which light source is later used at the length determination. The intensity emitted therefrom may also be analysed through out the whole bandwidth of the light source, which is to be used at the length determination.

If two consecutive interference wavelengths $\lambda_1$ and $\lambda_2$ have been obtained, following equation system can be used for estimating the resonator length L $$\begin{cases} I\lambda_1 = 2L \\ (I+1)\lambda_2 = 2L \end{cases} \quad (1)$$

$$\lambda_1 > \lambda_2$$

$$\begin{cases} I = \dfrac{\lambda_2}{\lambda_1 - \lambda_2} \\ L = \dfrac{\lambda_1 \lambda_2}{2(\lambda_1 - \lambda_2)} \end{cases}$$

where I is the interference number, n the refractive index inside the cavity, and L the optical length of the cavity or resonator.

In relation to this invention the term possible interference number, relate to the interference numbers which can be assumed for a certain cavity. As explained above the group of possible interference numbers for a certain cavity is defined by the cavity design or the properties of the cavity, such as selected materials for the cavity walls and their reflectivity as well as the refractive index inside said cavity. More specifically, the group of possible interference numbers may be determined by the properties of the cavity in combination with the properties of the light source, such as band width and coupling into the cavity.

In relation to this invention the term wave guide refers to a device, which is capable of transmitting radiation emitted from the radiation source to the resonator. Waveguides used at optical frequencies are preferably dielectric waveguides, i.e. structures in which a dielectric material with high permittivity, and thus high index of refraction, is surrounded by a material with lower permittivity. This structure guides optical waves by total internal reflection. The most common optical waveguide is an optical fibre. Other types of optical waveguide include photonic-crystal fibre, which guides waves by any of several distinct mechanisms. Further guides in the form of a hollow tube with a highly reflective inner surface, which may be of polished metal or may be covered with a multilayer film that guides light by Bragg reflection, may also be used. One can also use small prisms around the pipe which reflect light via total internal reflection. The end of the wave guide may be arranged in the wall of the resonator. If an optical fibre is used it may be ground at the same time as the resonator wall, such that a substantially flat surface is achieved.

According to one example, the wave guide is an optical fiber which is provided with a GRIN-lens on the end of the fiber facing the resonator. This facilitates the measurement of longer resonators having a length of e.g. a couple of centimeters.

In relation to this invention length L normally refers to the optical length or e.g. a resonator for a certain wavelength. In order to convert this value to the geometrical length following expression may be used: L($\lambda$)=L$_{GEO}$*n($\lambda$), wherein L is the optical path length, L$_{GEO}$ the corresponding geometrical length and n the refractive index inside the resonator as dependent on wavelength. Based on the length or the geometrical length of the resonator, further properties or physical parameters of the system may be determined such as a pressure force or strain acting on the resonator, the temperature of the resonator, the refractive index inside the resonator.

In relation to this invention the term spectrometer refers to any device which is capable of converting an electromagnetic spectrum to a digital one, such that the intensity of the radiation as dependent on the frequency and/or wave length may be determined. The spectrometer may comprise storing means for holding the digital spectrum. The spectrometer may e.g. be a grating-based spectrometer e.g. equipped with a CCD-detector, but many other types of spectrometers are possible. When converting the optical spectrum to a digital one, the spectrometer normally has a predetermined sample rate during which light is recorded. In other words, the digital spectrum of the spectrometer is normally an averaged spectrum from the light source, which is averaged over one sample interval.

Advantageously, the spectrum received from the resonator is normalized, preferably by comparing it to a reference spectrum, even more preferred by comparing it to a reference spectrum of said radiation source, and most preferred by subtracting said reference spectrum from said resonator spectrum $S_r$. This is advantageous as it enables a more accurate measurement result to be achieved, as some wavelength dependent variations of the radiation source may be compensated for. The smaller the difference between the refractive index inside the resonator and the index of the reflecting resonator wall, the more important to clear the spectrum from e.g. noise and disturbances, e.g. by use of a reference spectrum according to known method, in order achieve a more accurate result of the determination.

Preferably, the recorded spectrum from said resonator is Fourier transformed before the length of the resonator is determined. This is advantageous as it increases the accuracy of the determination. Optionally, the determination of said resonator length comprises the step of determining the centre of location of the resonant part, i.e. a pulse, of said transformed spectrum. The use of a function for determining the centre of location of the resonant part is advantageous as it normally is a stable method, which is available as a standard function.

According to one embodiment, the recorded spectrum from the resonator is first provided in the frequency domain, before said Fourier transform is preformed. This is advantageous as it increases the accuracy of the determination. Further, window functions e.g. Hanning, Hamming, Blackman and zero-padding techniques may be used to further improve the accuracy of the determination.

The band width of said radiation is preferably chosen such that that the recorded spectrum comprises at least two interference minima or at least two interference maxima, even more preferred the interference spectrum comprises at least five interference minima or at least five interference maxima. This is advantageous as improves the accuracy of the determination of the cavity length.

According to one embodiment a first and a second mark wavelength are selected by determining a mark wavelength for one maximum and one minimum, or for two different maxima or two different minima of said spectrum. This is advantageous as it improves the accuracy of the determination of the cavity length. Moreover, a respective interference number is determined using e.g. a ratio of said value of the cavity length and said first or second mark wavelength. Alternatively, only a first interference number corresponding to said first mark wavelength is computed, and said second interference number is determined based on the relation between the mark wavelengths, i.e. the number of maxima or minima present in the spectrum between said first mark wavelength and said second wavelength. According to one embodiment a second resonator length is computed by performing the same steps for said second mark wavelength as were described for the mark wavelength in relation to the independent claims.

When the interference number is calculated, one may distinguish between the cases where the index in the cavity is known to be higher or lower compared to the index of the optical fibre and when the index is completely unknown. In the former case, the algorithm or method may be arranged to chose an interference number from a pre-selected list of possible interference numbers, e.g. 1, 2, 3 . . . or 0.5, 1.5, 2.5 . . . , corresponding to the known interference number. In the latter case, the algorithm or method may be arranged to choose both list and interference number.

Alternatively or additionally the actual interference number may be determined by approximating the estimated interference number by the closest possible interference number, i.e. an integer or half integer depending on the properties of the cavity, using a suitable mathematic function such as e.g. rounding.

Moreover, a general method for determining the actual interference number is also contemplated which can be used both for cavities having integer interference numbers and for cavities having half-integer interference numbers. According to this method the actual interference number is determined by approximating or correcting the estimated interference number by the one of all half integers and all integers being closest to said estimated interference number. In other words, the method requires that the error in the estimation of the interference number is less than 0.25. The approximation or correction can be performed e.g. by selecting the closest number in a list of all positive integers and half integers, or by use of a mathematical function for rounding said estimated interference number as explained above. According to one example a polychromatic light source is used, i.e. the radiation source is operative to emit polychromatic light. Examples of such light sources are: a halogen lamp, a LED, an SLED or a tuneable laser. Depending on the length of the cavity, radiation sources based on radio frequencies, microwave signals and X-ray might also be used. The light source is preferably selected such that $$\Delta\lambda \geq \frac{3\lambda_C^2}{L},$$

where $\Delta\lambda$ is the bandwidth or tunable range of the radiation source, $\lambda_c$ is the centre wavelength of the radiation source, L the optical length of the resonator. Advantageously, the intensity of the radiation source is substantially equal over $\Delta\lambda$. According to one embodiment the resonator geometrical length of the resonator varies between 20 μm and 100 μm with air filled cavity, and $\lambda_c$ is 830 nm, i.e. the band width of the light source is preferably at least $3*0.83^2/20=100$ nm.

According to one example the resonant wave inside said resonator is formed by unpolarized light.

According to one example said light source is a swept light source, such as a tuneable laser. Preferably, said wave guide is an optical fibre, as an optical fibre normally is stable also in harsh environments.

According to one embodiment said recording unit comprises spectrometer means for determining the intensity of the radiation at different wave-lengths. Advantageously, the wavelength band of the recorded spectrum is $$\Delta\lambda \geq \frac{3\lambda_C^2}{L}$$

where $\Delta\lambda$ is the bandwidth of the recorded spectrum, $\lambda_c$ is the centre wavelength of the recorded spectrum and L the optical length of the resonator.

According to one example the resonator is formed by a first and a second surface of a work-head unit, and said work-head unit preferably comprises a first and a second part, which are separable, wherein said first surface is a surface of said first part and said second surface is a surface of said second part. The first and a second part may for example be a chuck and a work piece holder for insertion in said chuck, respectively, as is discussed in EP 1 849 556.

According to one example the resonator is an optical resonator, i.e. resonant light waves may be formed inside the resonator.

The medium inside the resonator may be a solid such as glass or plastic, gas or liquid or a combination of these, the medium may also comprise small particles. In other words, according to one embodiment the resonator is arranged to contain a fluid. More specifically the medium in the resonator may be cutting fluid as discussed in EP 1 849 556. According to one example the cavity is flushed just before the measurement is preformed, or at regular intervals, in order to clean the cavity from e.g. dust and particles, in order to further increase the accuracy of the measurements. One example of a suitable liquid for cleaning the cavity is water mixed with isopropanol. Flushing may be preformed through the holes having the reference numeral 11 in EP 1 849 556.

One general way of calibrating a system, method or program according to the invention is by replacing one or several of the resonators which are normally used with a master resonator, having a known accurately determined length. The length of the master resonator is determined using the method according to the invention. Thereafter, the parameters of the measuring system are adjusted, e.g. calibration factors may be adjusted, such that the computed length of the master resonator corresponds to the previously determined length thereof. Calibration may be needed due to wear of the resonator, or because a property of the resonator has been changed. According to one example each time the cutting liquid used in the machine is changed from a first cutting liquid to a second cutting liquid, the master resonator is provided with the second cutting liquid, the length of the master resonator is determined and a calibration parameter is adjusted if needed.

Basically, for a given resonator and its resulting electromagnetic spectrum, the interference numbers may only assume certain values as is explained in more detail below. In essence, the invention is based on the realisation that this nature of the interference numbers may be used, for improving the accuracy of an interference number dependent parameter, e.g. $L_{EST}$. Thus, by using an estimation of a first parameter, e.g. $L_{EST}$, for computing an interference number, $I_{EST}$, replacing the calculated interference number with the closest one in a series of known or predetermined interference numbers $I_{CORR}$, and thereafter re-calculating said first parameter, e.g. $L_{EST}$, using the new interference number, $I_{CORR}$, —the accuracy of the determination of said first parameter, $L_{EST}$, may be improved.

These and other aspects of the invention will be apparent from and elucidated with reference to the embodiment(s) described hereinafter.

BRIEF DESCRIPTION OF THE DRAWINGS

In the following detailed description, reference is made to the drawings, on which:

FIG. 2b schematically illustrates the corresponding frequency spectrum to the wavelength spectrum shown FIG. 2a;

FIG. 2c schematically illustrates the resulting spectrum after a Fourier transform has been performed of the wavelength spectrum shown in FIG. 2a;

DETAILED DESCRIPTION OF DRAWINGS

Figure 1:
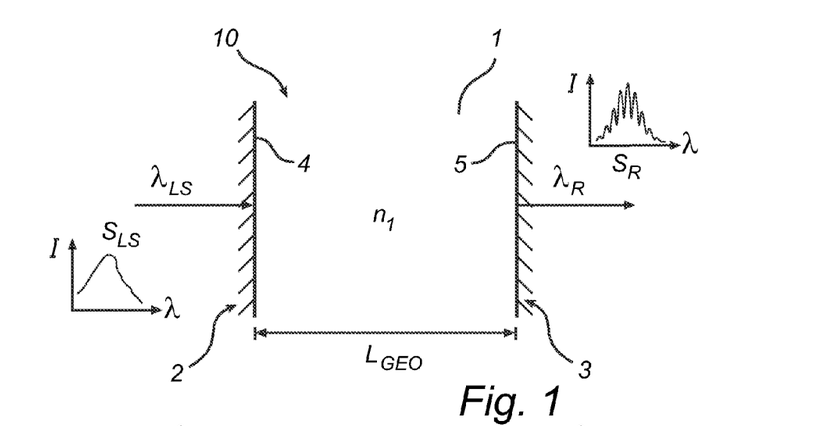
FIG. 1 schematically illustrates one example of a resonator according to the invention.
Figure 2A:
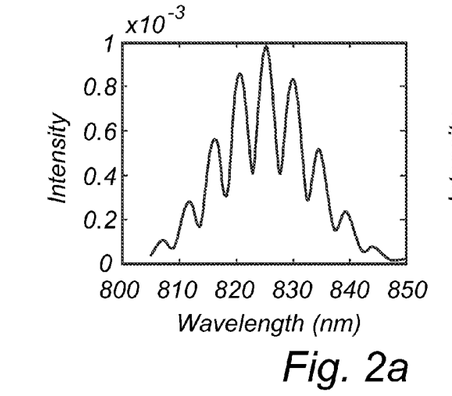
FIG. 2a schematically illustrates one example of a wavelength spectrum from said resonator.

FIG. 1 illustrates one example of a resonator, the length of which may be measured with the method described herein. Light $\lambda_{LS}$ is emitted into a resonator 10 having, at least momentarily, a length $L_{GEO}$, wherein said light has a first spectral distribution $S_{LS}$. The resonator illustrated in FIG. 1 comprises of a first medium 1, having a first refractive index $n_1$, arranged between a first and second end wall 2,3. In other words, the resonator has two surfaces 3, 4, which face each other, for reflecting light inside the resonator. The resonator also comprises means for emitting modified light $\lambda_R$ out of said resonator, wherein said modified light has a second spectral distribution $S_R$, an example of which is illustrated in FIG. 2a. According to this example the radiation is emitted from the resonator in a direction parallel with the direction by which it was emitted into the resonator. In other words the radiation is emitted into and out of the resonator at different walls, an in this example in two opposing wall, i.e. two walls arranged opposite each other. (2).

The second spectral distribution of the radiation emitted out of said resonator comprises peaks at wavelengths corresponding to resonating wavelengths of said resonator. The resonating wavelengths of the resonator are determined by the optical length of the resonator L between said end surfaces.

For this type of resonator or cavity the interference number is described by the following table:

TABLE 1

Possible interference numbers

| INTERFERENCE NUMBER | | Second end surface | | |
| --- | --- | --- | --- | --- |
| | | Metal | Higher index | Lower index |
| First end surface | Metal | N | N | (2N − 1)/2 |
| | Higher index | N | N | (2N − 1)/2 |
| | Lower index | (2N − 1)/2 | (2N − 1)/2 | N |

In the table above Metal means that the respective end surface 3, 4 of the resonator has metallic properties with respect to reflectance of the current wave-length. Lower index means that the refractive index of the respective end surface is lower compared to the refractive index of the medium 1 between said end surfaces 3,4. Higher index means that the refractive index of the respective end surface 3,4 is higher compared to the refractive index of the medium 1 between said end surfaces.

According to one example the medium 1 inside said cavity is air ($n_1$=1.0) and the end surfaces 3, 4 are made of highly reflecting metal. In this case the resonating wavelengths $\lambda_R$=2L/N, N=1, 2, 3 . . . , and the interference number or possible interference number I=2L/$\lambda_R$=N=1, 2, 3 . . . i.e. an integer value.

According to another example the medium inside the cavity is glass e.g. flint glass ($n_1$>1.52) and one of the end surfaces is made of reflecting metal and the other of crown glass (n=1.52). In this case the resonation wavelengths $\lambda_R$=4L/(2N−1), N=1, 2, 3 . . . , and the interference number I=2L/$\lambda_R$=(2N−1)/2=0.5, 1.5, 2.5 . . . , i.e. a half integer value.

According to yet another example, the resonator is a symmetric Fabry-Perot, i.e. $r_1$=$r_2$, and the transmitted signal can be expressed as:

$$|T(\lambda)|^2 = \frac{(1-R)^2}{(1-R)^2 - 4R\sin^2\left(\frac{2\pi L}{\lambda}\right)} \quad (2)$$

where $r_1^2 = r_2^2 = R$, and $r_1$, $r_2$ are the reflectivities for the first and second surface respectively, L the cavity length and $\lambda$ the wavelength. In this case, only the diagonal cells in Table 1 are of importance and hence the interference numbers are always of integer type.

According to one method a first step a group of possible interference numbers is determined, e.g. defined by the expression N or (2N−1)/2, depending on the properties of the cavity. Thereafter, a first estimation of the interference number is determined $L_{EST}$, which is later rounded off to the closest value contained in said group of possible interference numbers.

Figure 2B:
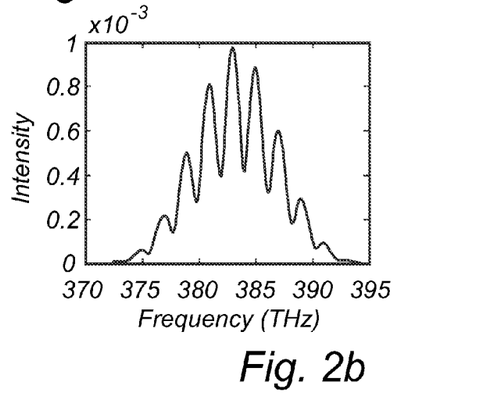
Figure 2C:
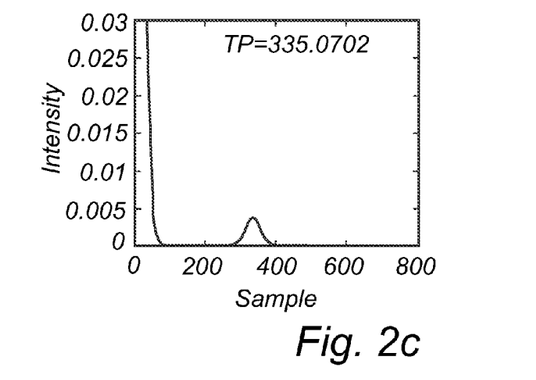

The radiation spectrum emitted from the resonator is transmitted to and recorded by recording means. The spectrum is preferably transmitted by means of a wave guide. A first estimation of the cavity length $L_{EST}$ is determined, e.g. by providing a stored value or by computing it from the stored spectrum using a known method. According to one example the estimation is computed by localising fundamental frequency of the interference spectrum. This may be done by performing a Fourier transform of the stored spectrum either in the wavelength or the frequency domain. Normally, it is preferred to perform the Fourier transform in the frequency domain of the spectrum as this generally gives a better accuracy. FIG. 2b illustrates the spectrum in the frequency domain $S_R$(f), and a Fourier transform of this spectrum is found in FIG. 2c. In the Fourier spectrum one can identify two pulses, the left most of these is the DC-contribution of the light source, the other corresponds to the fundamental frequency $f_R$ of the spectrum. The resonance frequency $f_R$ may be determined by using mathematical function which identifies the centre of location of the peak. In order to improve the accuracy of the mathematical functions, window functions can be used to prepare the spectrum. According to one example zero-padding techniques are used. Preferably, the Fourier transformed spectrum comprises at least 5 fringes, i.e. for a resonator length of 20-100 μm the band width of the radiation source is preferably about 50-100 nm, depending on the desired number of fringes.

Figure 3:
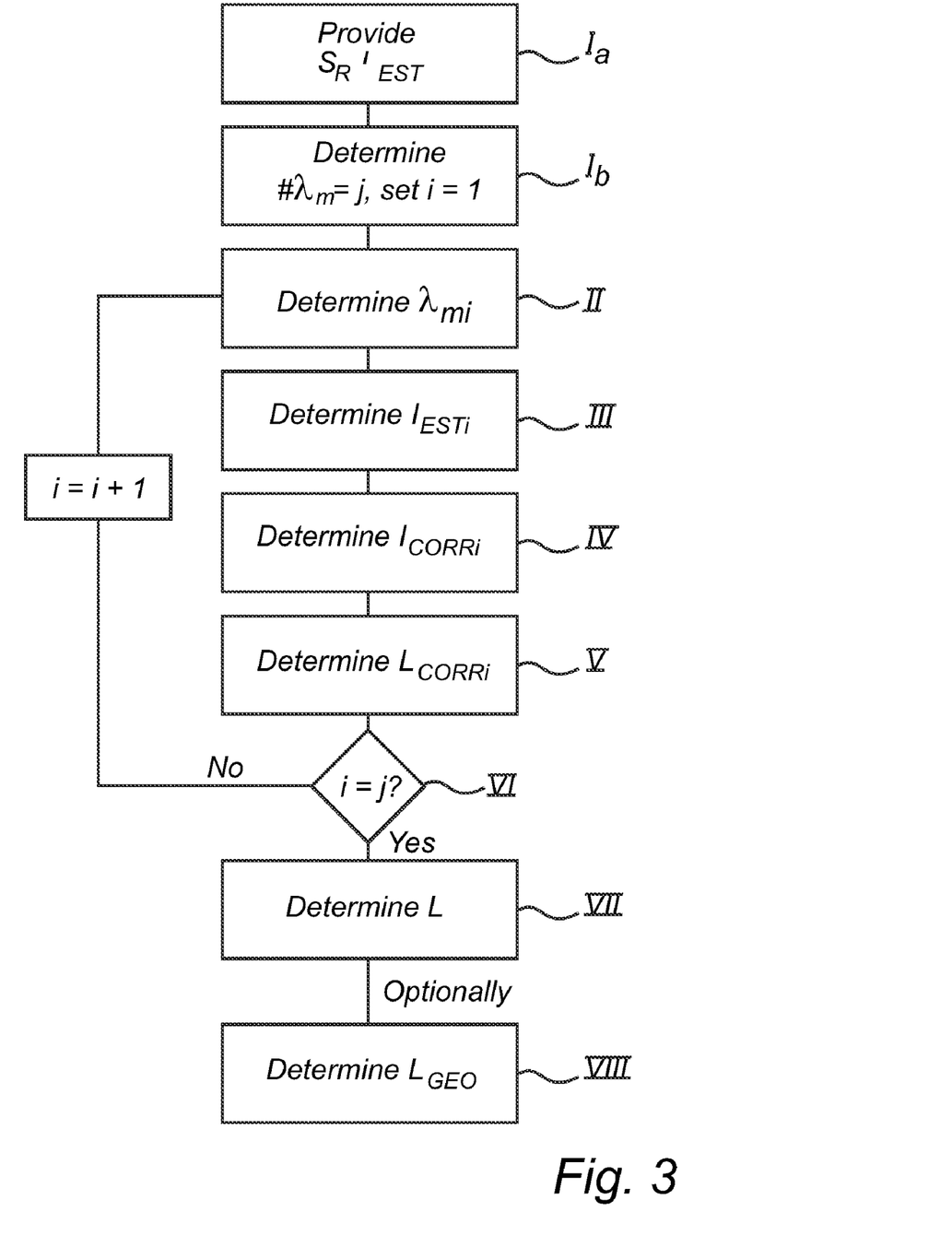
FIG. 3 is a block diagram illustrating one example of steps to be performed in order to determine the length of the resonator.

FIG. 3 illustrates an example of the steps, which may be performed in order to determine the length of the resonator. In a first step Ia a recorded wavelength spectrum $S_R$, and a first estimation of the cavity length $L_{EST}$ is provided to an analyzing unit. In another step Ib the number of different mark wavelengths j that are to be selected is determined, and the current number is set to i=1. In a second step II a first mark wavelength $\lambda_{M1}$ corresponding to a resonation wavelength of said spectrum is selected or determined. Generally, the greater number of mark wavelengths j that are selected and used of computing the length of the resonator, the more accurate the result. $\lambda_{Mi}$ may be determined by identifying the position of a turning point or a local maximum or minimum of $S_R$ using either the wavelength or the frequency domain. Alternatively, $L_{EST}$ may be used to compute an approximation of $\lambda_M$, which indicates the approximate location for the inflexion point. When an approximation of $\lambda_M$ has been determined, an algorithm involving parabolic curve fitting may be used to determine the maximum or minimum of the curve.

Thereafter, in a third step III a first estimation of the interference number $I_{EST}$ is determined by computing the ratio between e.g. 2*L/$\lambda_M$ and, in step IV, the value of $I_{EST}$ is rounded off or set to the closest possible interference number, as defined by the predetermined properties of the resonator and in accordance with the table above. In other words, first the possible interference numbers are determined or a group of possible interference numbers is provided, e.g. based on the properties of the resonator, and thereafter the first interference number $I_{EST}$ is rounded off to the closest one of these interference numbers. According to another example, the refractive index of the medium (1) inside the cavity is unknown. In this case all possible interference numbers (corresponding to the current resonator but independent on refractive index) is determined, i.e. corresponding to a group comprising e.g. both half integer and integers. Provided that the estimated interference number is considerably closer to one of a half integer and an integer, the interference number $I_{EST}$ is rounded off or set to the closest one of those. E.g. for an estimated interference number, which differ from the closest integer or half-integer by less than e.g. 0.2, the correct interference number $I_{CORR}$ may be determined by rounding off said interference number to the closest one of the integer and the half-integer. In other words, there are instances for which the improved interference number $I_{CORR}$ can be identified, without any previous knowledge of the properties of the resonator. In step V, a more accurate or correct value of the cavity length $L_{CORR}$ is computed by determining the product of $I_{CORR}*\lambda_M/2$, in other words by determining $I_{CORR} * \lambda_M/2$.

Above, in step V the equations $I_{EST}$=2*L/$\lambda_M$ (=b*L/$\lambda_M$) and $L_{CORR}$=$I_{CORR}*\lambda_M/2$ (=$I_{CORR}*\lambda_M$/b) are used. According to one embodiment, as b is used in both equations, b may be set to have any value, except 0, as long as the same value is used for computing $L_{CORR}$, as was used for computing $I_{EST}$; and as long as the possible interference numbers are adjusted accordingly. For example, b=1 and I=N/b=1/b, 2/b, 3/b . . . , or I=N/(2*b)=1/(2*b), 2/(2*b), 3/(2*b) . . . , and $I_{EST}$ is set to one off these values. I.e. for determining the interference number it is sufficient to compute a ratio of $L_{EST}/\lambda_M$=$I_{EST}$, choose the closest $I_{CORR}$-value, from a group comprising e.g. 0.5, 1, 1.5, 2 . . . or 0.25, 0.5, 0.75, 1 depending on the configuration of the resonator, and calculate the product of $I_{CORR}*\lambda_M$=$L_{CORR}$.

According to one embodiment the number of mark wavelengths to be selected is set to three j=3, and three consecutive maxima or minima of the spectrum are determined $\lambda_{M1}$, $\lambda_{M2}$, $\lambda_{M3}$. For each of these wavelengths a corresponding vale of $I_{ESTi}$ is determined, using the relation $I_{ESTi}=2*L_{EST}\lambda_{Mi}$, i=1, 2, 3. For each value of $I_{ESTi}$ a value of $I_{CORRi}$, and $L_{CORRi}$ is determined as described above. Thereafter, a mean value of $L_{CORR}$ is computed based on $L_{CORRi}$, with due adjustment for the variation of the refractive index with different wavelengths. According to one example, $L_{GEOi}=n*\lambda_{Mi}$ is computed for each $\lambda_{Mi}$, thereafter a mean value for $L_{GEO}$ is computed based on $L_{GEOi}$.

Alternatively, only one value of $I_{EST}$ and $I_{CORR}$ is computed. Thereafter e.g. two more values of $I_{CORR}$ are determined based on the knowledge of the properties of the resonator. In other words, if $I_{CORR1}=34$, $I_{CORR2}$ and $I_{CORR3}$ are taken to be 33 and 35, respectively. Thereafter, the inflexion points in $S_R$ corresponding to $\lambda_{M2}$ and $\lambda_{M3}$ is determined. Finally, $L_{CORRi}$ is determined based on $I_{CORRi}*\lambda_{Mi}/2$ i=1, 2, 3 and a mean value of L is computed as described above.

According to another example the resonator is arranged as described above, with the exception that the light is emitted into and out of the resonator at the same reflective surface 1. The length of the resonator is determined in the same way as was described above. Please note, that changing the position of the exit surface for the radiation with respect to the entrance surface in most cases results in a different set of possible interference numbers.

Figure 4:
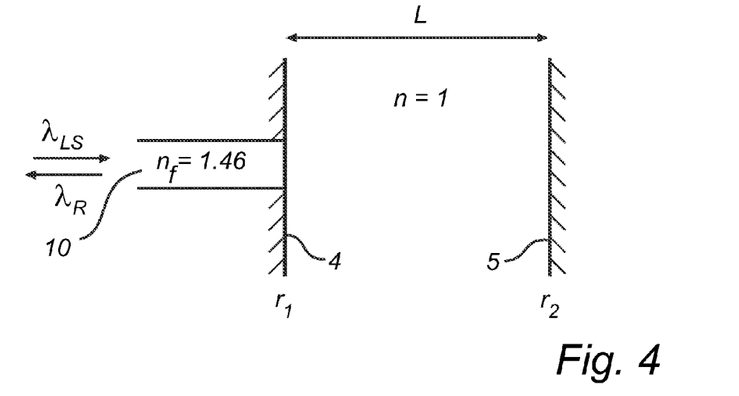
FIG. 4 schematically illustrates a resonator, wherein the light is fed by means of an optical fibre.

FIG. 4 is a schematic illustration of one example of a resonator, arranged as described in relation to FIG. 1, with the exception that the entrance surface 4 for the radiation into the cavity, is the same as the exit surface 4. According to a specific example the resonator comprises a first end surface 4, wherein an optical fibre 10 is arranged, and a second end surface 5 of metal. The first end surface 4 is the interface between air (n=1) in the resonator and the optical fibre (n=1.46), the reflectivity for this surface is expressed $r_1$. The second end surface is the interface between the air in the resonator and a metal surface, $r_2$. Light travelling inside the interferometer is non-collimated since the light injected into the interferometer origins from a plane fibre-facet with NA=0.13. The distance between said first and second end interfaces represent the length of the resonator L.

For a cavity having this configuration the possible interference numbers are positive integers when the refractive index is greater than the refractive index of the optical fiber, and positive half integers as when the refractive index is lower than the refractive index of the optical fiber.

For this example the reflected field strength corresponds to:

$$R(\lambda) = \frac{r_1 - r_2 e^{-j\frac{4\pi L}{\lambda}}}{1 - r_1 r_2 e^{-j\frac{4\pi L}{\lambda}}} \quad (3)$$

where L is the optical length of the resonator, $r_1$ and $r_2$ are the reflectivities as explained above, $\lambda$ is the wavelength at which the optical length is determined. This corresponds to a reflected intensity corresponding to:

$$|R(\lambda)|^2 = \frac{(r_1+r_2)^2 - 4r_1 r_2 \cos^2\left(\frac{2\pi L}{\lambda}\right)}{(1+r_1 r_2)^2 - 4r_1 r_2 \cos^2\left(\frac{2\pi L}{\lambda}\right)} \quad (4)$$

From this equation an estimation of e.g. the length of the cavity $L_{EST}$ may be computed.

The above expression corresponds to a modulation depth of:

$$A = \frac{4r_1 r_2(1-r_1^2)(1-r_2^2)}{(1-r_1^2 r_2^2)^2} \quad (5)$$

From equation (5) it can be proven that provided that $r_2$ is larger than $1/\sqrt{3} \approx 0.58$, a maximum modulation depth is obtained, independent of the value of $r_1$. However, the method may be used even if the modulation depth is not maximised.

According to one embodiment the resonator in a work head, which comprises two walls (4,5), the distance between which is adjustable, e.g. by applying an increased direct or indirect pressure to one of the surfaces by means of a processing tool. Said walls are preferably substantially parallel and made of a reflective material. By measuring the instantaneous distance between the surfaces, the pressuring force of the tool may be determined. The optical waveguide is e.g. an optical fibre, the end of which is provided in one of the end surfaces, preferably substantially in the same plane as the reflecting wall surface inside the resonator. In other words, in this arrangement the surface of the optical fibre is comprised in one of the resonator walls and is one of the surfaces against which the light is reflected. In yet other words, the end surface of the resonator may comprise two or more different material such as, in this case, metal and glass. In this embodiment the optical fibre is preferably used both for transmitting light from the light source to the resonator, and for transmitting light or the modified spectrum from the resonator to the recording means.

Figure 5:
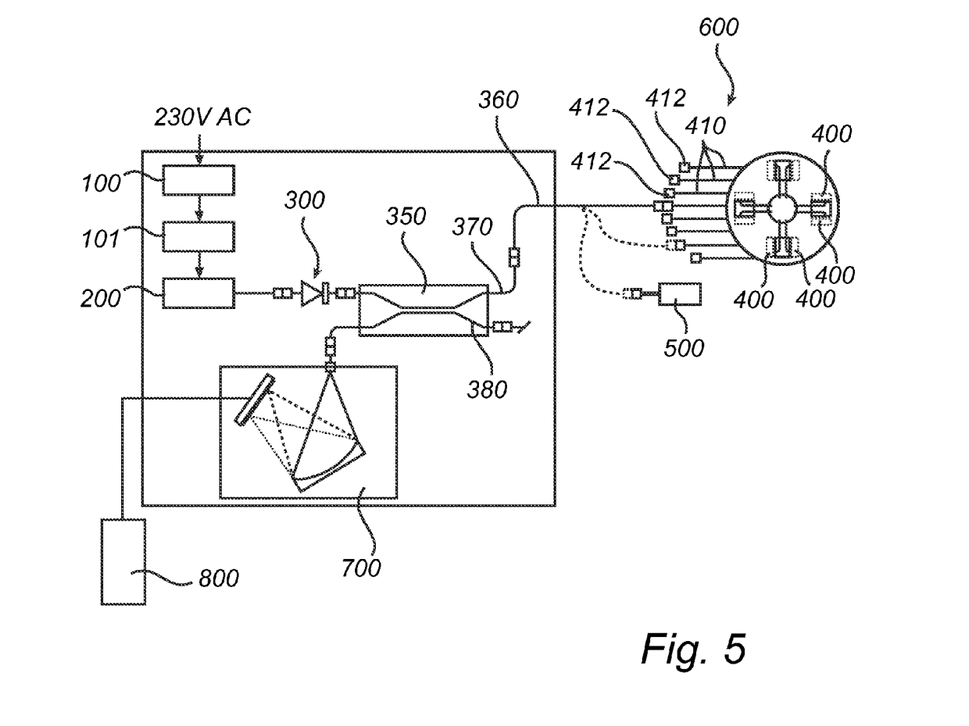
FIG. 5 schematically illustrates an optical setup for determining the distances between several pair of surfaces in a work head.

FIG. 5 illustrates one embodiment of the invention, having several resonators comprised in a work head. The pair of squares in the figure illustrate contacts, e.g. APC:s (angled physical contacts), for connecting one fiber end to another. The system comprises a power source, to power an SLED 200. The power source comprises a power supply unit 100 and a driver 101. Downstream of the light source or SLED, there is an optional optical isolator 300 and thereafter an optional beam splitter 350. The light emitted from the SLED is received by the isolator 300 before it is passed to the beam splitter on its way to the resonators 400. One light path 370 from the beam splitter 350 is led to the resonators 400, and the other 380 is preferably absorbed or transmitted out of the system, such that reflection from the second path do not interfere with the measurements. The resonators 400 are e.g. arranged as described in EP 1 849 556 Preferably, optical fibres 410 are permanently arranged in the work head 600, and each arranged with a contact 412, e.g. an APC contact, such that the light from the light source 200 is easily connected to a particular resonator 400 by means of feeding light from the beam splitter 350 to the corresponding optical fibre contact 412 of the work-head 600. The system may also comprise an optional reference resonator 500, e.g. an ultra stable Fabry-Perot cavity, for calibration or verification of the system. The reference resonator may be used for determining e.g. the stability of the system. The dashed lines indicate that the optical fibre 360 optically coupled to and the beam splitter 350 and the light source 200, may be connected to the reference resonator 500 and any of the work head resonators 400 one at a time. Alternatively, the light can be emitted into several resonators 400 at the same time, wherein the measuring system comprises means for separating the light emitted out of each cavity 400 such that it can be stored by the recording means as separate entities. After the light has been reflected within a resonator 400 of the work head 600, it is returned to via the optical fibre 410, 360 to the beam splitter 350 and thereafter to a spectrograph or interferometer 700, e.g. a grating-based spectrograph using a CCD-array, preferably comprising storing means for saving a measured spectrum sample. The storing means may also be arranged in a separate processing unit. The sampling frequency of the interferometer 700 is one of the factors which determine the time span over which the instantaneous or momentary length of the resonator L is averaged. In other words the determined length of said resonator, L or $L_{GEO}$, corresponds to a length as averaged during one sampling period.

The saved spectrum is thereafter provided to computing means 800, e.g. a computer or a logical circuit, which determines the optical length of the resonator L based on the spectrum, according to the method described above. According to one example an Ocean Optic Spectrometer HR 4000 is used.

Although, the interference numbers above has been determined for a straight resonator having substantially parallel end surfaces. The interference numbers may be determined for any resonator, and thereafter the optical length of the resonator may be determined by the above described method. Thereafter the geometrical length may be computed.

Even if the measuring principle is partly described with reference to milling machines etc, it is to be understood that as long as a suitable radiation source is selected; the wave guide is arranged in relation to the object surface, the distance to which is to be measured, such that resonating waves from the radiation source may be formed between the wave guide and the object surface; and a suitable a portion of the spectrum resulting from the resonating waves is recorded as discussed above—the method for determining a resonator length, or the distance between the wave guide and the object surface, as described herein, is not limited to any particular field of technology. In other words, the method and system described herein may be used as a general distance measuring sensor.

A person skilled in the art will given the above described conditions be able to select a suitable radiation source, interferometer and recording means or recorder. He also realizes that the present invention by no means is limited to the preferred embodiments described above. On the contrary, many modifications and variations are possible within the scope of the appended claims. For example, a frequency swept laser may be used instead of an SLED, a closed metallic wave guide may be used instead of the optical fibre, wireless communication may be used for transmitting the digital spectrum to the analyzing unit.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of determining the distance between a waveguide and the surface of an object, the method comprising:

providing a resonator having a first and a second reflective end surface, said second reflective end surface being the object surface, the distance to which is to be measured;

transmitting electromagnetic radiation ($\lambda_{LS}$) in a waveguide, and emitting said electromagnetic radiation into said resonator, wherein said electromagnetic radiation comprises at least one resonance wavelength;

forming at least one resonant wave inside said resonator by means of said electromagnetic radiation ($\lambda_{LS}$);

transmitting a spectrum of said radiation ($S_R$), emitted out of said resonator, in a waveguide to a recording unit;

recording said emitted spectrum ($S_R$) by said recording unit, and providing said recorded spectrum to an analyzing unit;

estimating, at said analyzing unit, at least one value of the resonator length ($L_{EST}$), wherein said estimating of at least one value of the resonator length ($L_{EST}$) comprises performing a Fourier transform of at least a portion of said recorded spectrum;

selecting, at said analyzing unit, at least one mark wavelength ($\lambda_M$) of said spectrum by determining a maximum, a minimum or an inflexion point of said recorded spectrum;

computing an estimated interference number ($I_{EST}$), based on a ratio ($2*L_{EST}/\lambda_M$) of two times said at least one value of the resonator length ($L_{EST}$) and said working wavelength ($\lambda_M$);

determining an actual interference number ($I_{CORR}$) as the closest integer or half-integer to said estimated interference number ($I_{EST}$); and computing a second value of the resonator length ($L_{CORR}$) based on half the product ($I_{CORR}*\lambda_M/2$) of said actual interference number ($I_{CORR}$) and said working wavelength ($\lambda_M$).

2. A method according to claim 1, further comprising:

receiving said electromagnetic radiation from a radiation source, before said electromagnetic radiation is transmitted and emitted into said resonator; and normalizing said recorded wavelength spectrum by comparing it to a reference spectrum, and preferably to a reference spectrum of said radiation source.

3. A method according to claim 2, wherein said determining of at least one value of the resonator length (L) further comprises converting at least a portion of said wavelength spectrum to the frequency domain, before said Fourier transform is performed.

4. A method according to claim 3, wherein the band width of said electromagnetic radiation ($\lambda_{LS}$) is chosen such that that said recorded spectrum comprises at least two interference minima or at least two interference maxima.

5. A method according to claim 4, wherein said selecting of at least one mark wavelength ($\lambda_M$) comprises selecting further mark wavelengths by determining further different maxima and/or a minima of said spectrum.

6. A method according to claim 5, wherein said determining of an actual interference number ($I_{CORR}$) further comprises providing a group of pre-determined possible interference numbers.

7. A system for determining a distance between a waveguide and the surface of an object, comprising:

a resonator having a first and a second reflective end surface, said second reflective end surface being the object surface, the distance to which is to be measured;

a first set of radiation transmitters arranged to transmit electromagnetic radiation ($\lambda_{LS}$) to said resonator;

a recorder operative to record an electromagnetic spectrum ($S_R$);

a second set of radiation transmitters arranged to transmit radiation from said resonator to said recording means; and analyzer operative to determine a length (L) of said resonator by:

estimating at least one value of the resonator length ($L_{EST}$), wherein said estimating of at least one value of the resonator length ($L_{EST}$) comprises performing a Fourier transform of at least a portion of said recorded spectrum;

selecting at least one mark wavelength ($\lambda_M$) of said spectrum by estimating a maxima, minima or an inflexion point of said recorded spectrum;

computing an estimated interference number ($I_{EST}$), based on a ratio ($2*L_{EST}/\lambda_M$) of two times said at least one value of the resonator length ($L_{EST}$) and said working wavelength ($\lambda_M$);

determining an actual interference number ($I_{CORR}$) as the closest integer or half-integer to said estimated interference number ($I_{EST}$); and computing a second value of the resonator length ($L_{CORR}$) based on half the product ($I_{CORR}*\lambda_M/2$) of said actual interference number ($I_{CORR}$) and said working wavelength ($\lambda_M$).

8. A system according to claim 7, wherein an optical fiber is arranged in said first end surface, and said second end surface is of metal.

9. A system according to claim 7, wherein the resonator is formed by a first and a second surface of a work-head unit, wherein said work-head unit preferably comprises a first and a second part, which are separable, wherein said first surface is a surface of said first part and said second surface is a surface of said second part.

10. A system according to claim 7, wherein said resonator comprises two reflecting, substantially parallel surfaces for forming resonating waves of said electromagnetic radiation.

11. A system according to claim 7, wherein said resonator is a resonator selected from a group comprising Fabry-Perot interferometers, Fizeau interferometers, Gires-Tournois etalons, Michelson interferometers and circular resonators.

12. A system according to claim 7, wherein said radiation transmitting means comprises a waveguide and preferably an optical fibre.

13. A system according to claim 7, wherein said resonator is arranged to contain a fluid.

14. A computer program carrying physical media capable of storing a computer program for controlling a system according to claim 7 and to program a programmable processing apparatus to become operable to perform a method for determining a distance between a waveguide and the surface of an object comprising:

receiving a recorded electromagnetic spectrum ($S_R$) modified by a resonator (1) having a reflective end surface being the object surface, the distance to which is to be measured;

estimating at least one value of the resonator length ($L_{EST}$), wherein said estimating of at least one value of the resonator length ($L_{EST}$) comprises performing a Fourier transform of at least a portion of said recorded spectrum;

selecting a mark wavelength ($\lambda_M$) of said spectrum by determining a maxima, minima or an inflexion point of said recorded spectrum;

computing an estimated interference number ($I_{EST}$), based on a ratio ($2*L_{EST}/\lambda_M$) of two times said at least one value of the resonator length ($L_{EST}$) and said mark wavelength ($\lambda_M$);

determining an actual interference number ($I_{CORR}$) as the closest integer or half integer to said estimated interference number ($I_{EST}$); and computing a second value of the resonator length ($L_{CORR}$) using half the product ($I_{CORR}*\lambda_M/2$) of said actual interference number ($I_{CORR}$) and said mark wavelength ($\lambda_M$).

15. A computer program carrying physical media capable or storing a computer program for controlling a system according to claim 8 and to program a programmable processing apparatus to become operable to perform a method for determining a distance between a waveguide and the surface of an object comprising:

receiving a recorded electromagnetic spectrum ($S_R$) modified by a resonator having a reflective end surface being the object surface, the distance to which is to be measured;

estimating at least one value of the resonator length ($L_{EST}$), wherein said estimating of at least one value of the resonator length ($L_{EST}$) comprises performing a Fourier transform of at least a portion of said recorded spectrum;

selecting a mark wavelength ($\lambda_M$) of said spectrum by determining a maxima, minima or an inflexion point of said recorded spectrum;

computing an estimated interference number ($I_{EST}$), based on a ratio ($2*L_{EST}/\lambda_M$) of two times said at lest one value of the resonator length ($L_{EST}$) and said mark wavelength ($\lambda_M$);

determining an actual interference number ($I_{CORR}$) as the closest integer or half integer to said estimated interference number ($I_{EST}$); and computing a second value of the resonator length ($L_{CORR}$) using half the product ($I_{CORR}*\lambda_M/2$) of said actual interference number ($I_{CORR}$) and said mark wavelength ($\lambda_M$).

* * * * *